United States Patent Office 3,345,181
Patented Oct. 3, 1967

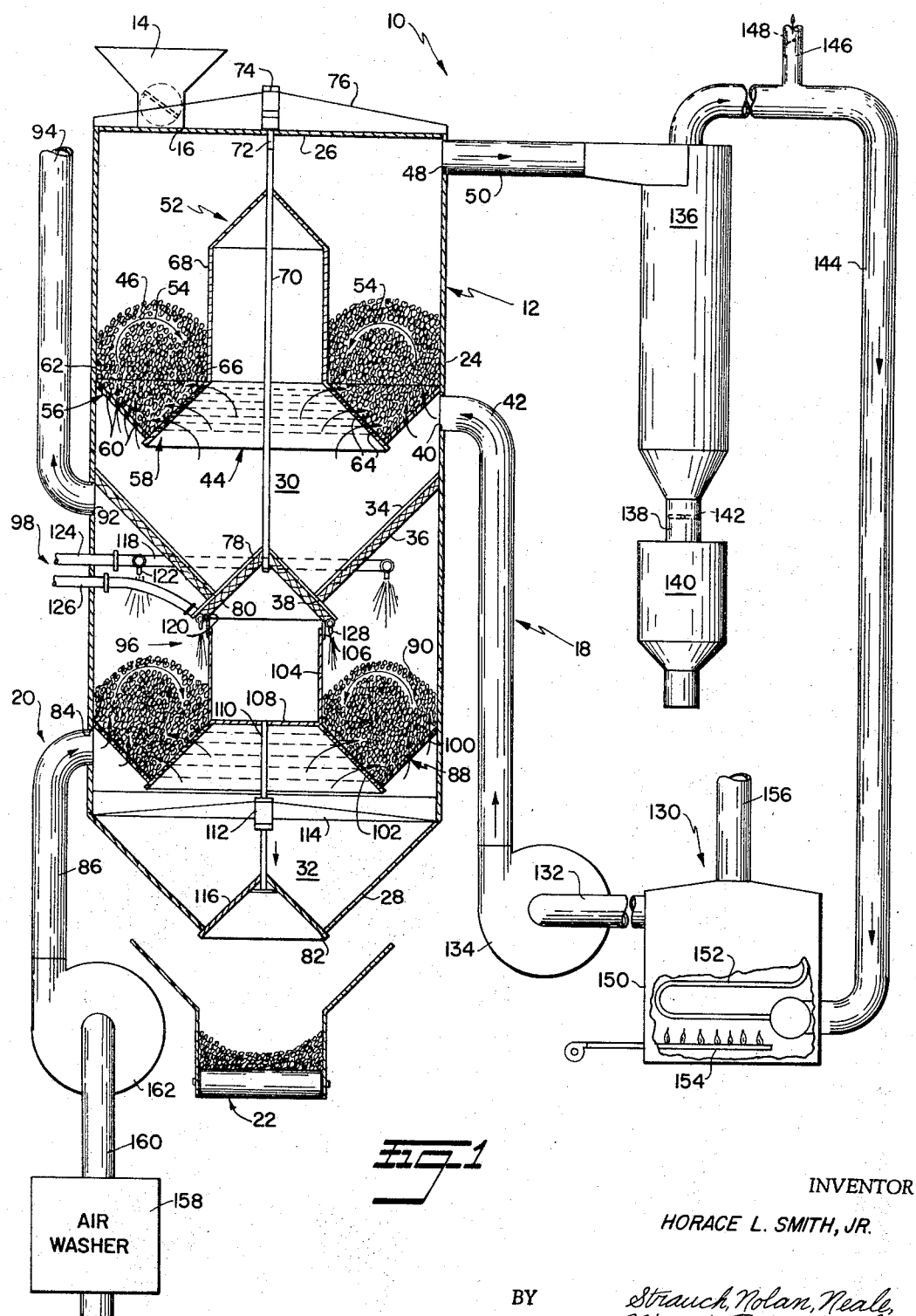

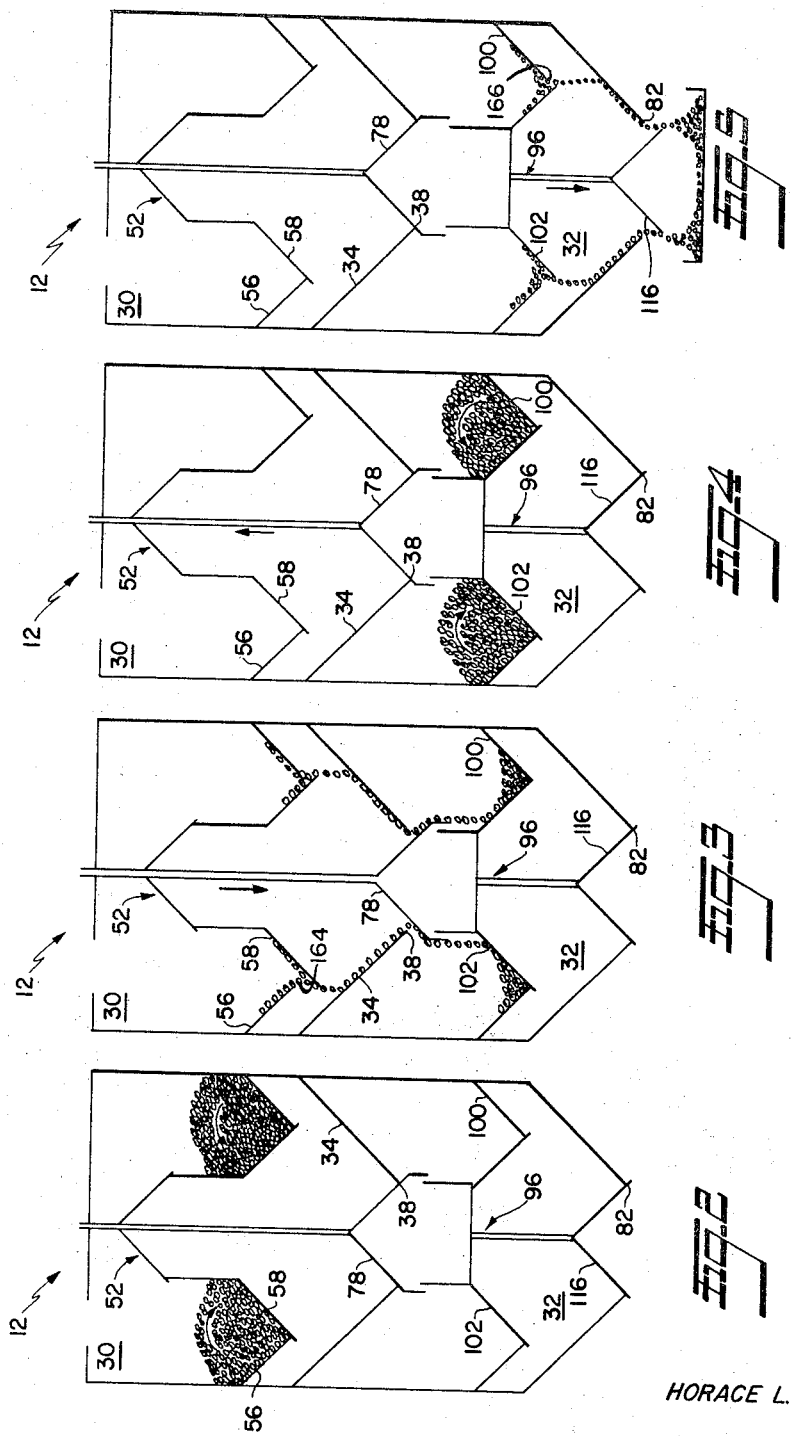

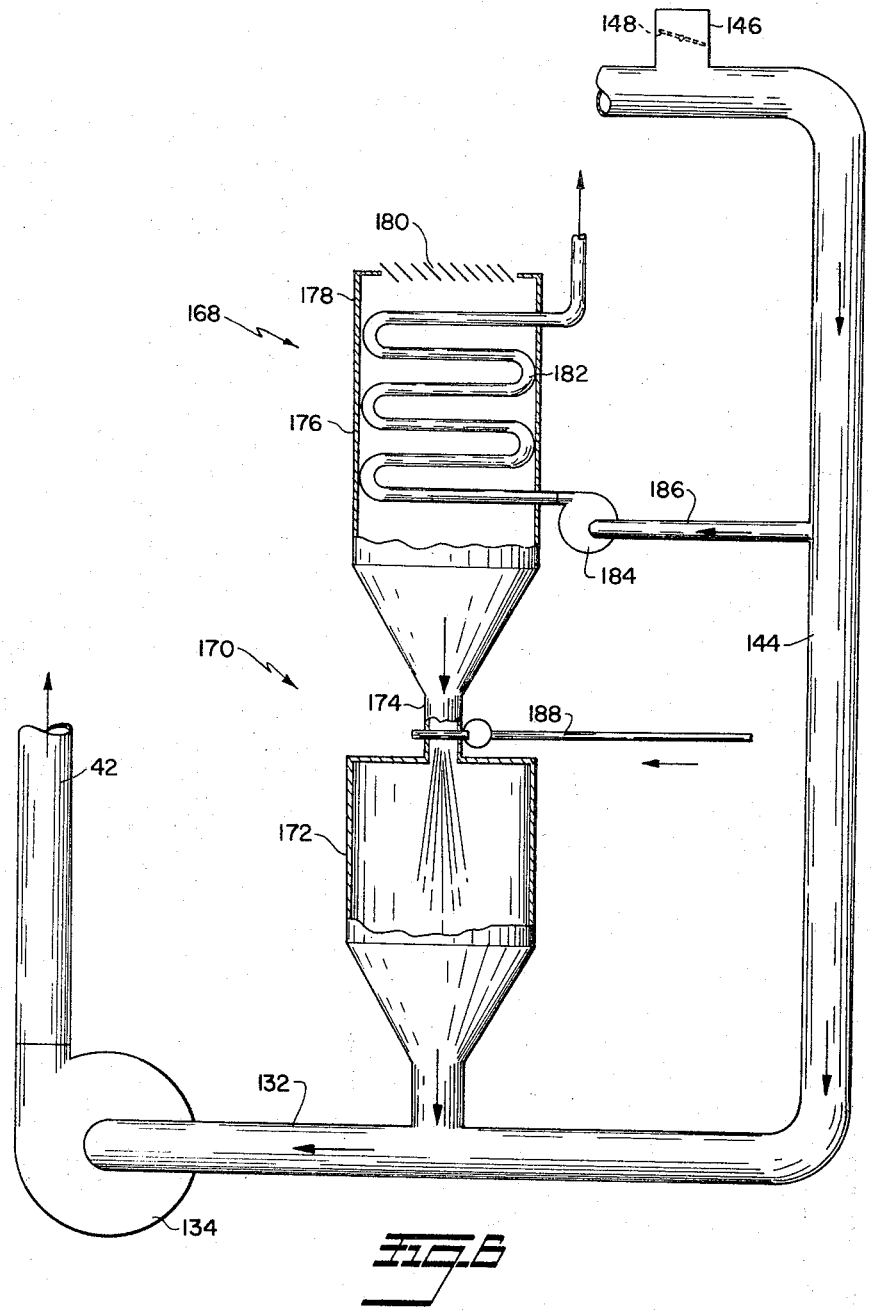

3,345,181
METHOD FOR ROASTING COFFEE BEANS AND SIMILAR PARTICULATE SOLIDS
Horace L. Smith, Jr., Richmond, Va., assignor to Hupp Corporation, Cleveland, Ohio, a corporation of Virginia
Filed Jan. 24, 1966, Ser. No. 522,691
5 Claims. (Cl. 99—68)

This invention relates to novel methods of contacting fluids and solids and, more specifically, to fluid-solids contact methods which are especially adaptable to the roasting of coffee and similar solids.

My copending applications Nos. 425,702 filed Jan. 15, 1965, for Apparatus and Method and 522,503 filed Jan. 24, 1966, for Apparatus and Method disclose novel fluid-solids contact methods in which the solids being processed are fluidized and rotated by the treating fluid. It is the primary object of the present invention to provide novel, improved methods employing this technique which are particularly applicable to the roasting of coffee at atmospheric pressure and to similar processes.

In its preferred form the apparatus by which this object is accomplished both roasts and cools the coffee beans being processed by the fluid-solids contact technique described in my copending applications. In addition this apparatus is preferably constructed in a novel manner which permits roasting and cooling to be carried out simultaneously in the same process vessel. Further important features of the present invention are a novel method of arresting the roast which virtually eliminates over-roasting and the use of combustion products as a roasting medium.

A large part of the coffee roasted at the present time is processed at atmospheric pressure. Most of this coffee is roasted in what is known as a Burns roaster, which is a horizontal rotating drum into which the beans to be roasted are dumped. As the drum rotates, a hot gas is blown through it to roast the beans.

Because of the slow turnover of the beans, heat transfer conditions are relatively poor and roasting times comparatively long. This is disadvantageous because yields decrease in proportion to the length of the roast. The slow turnover of the beans in a Burns roaster also results in nonuniform contact between the beans and the roasting gas and a consequent lack of uniformity in the roasted product.

In the present invention there is a much more rapid turnover of the beans than there is in a Burns roaoster. Consequently, heat transfer conditions are better so that roasting times are shorter and yields higher; and the final product is more uniform. In roasting certain types of coffees the reduction in roasting time also minimizes the loss of desirable volatiles and the progress of undesirable chemical reactions. This results in a product having superior quality and other highly desirable characteristics such as a greater extractible solids content and a longer shelf life.

Another important advantage of the present invention over the Burns roaster is that roasting and cooling of the roasted beans can be accomplished simultaneously in the same process vessel. This results in substantial reductions in both capital investment in equipment and in processing costs.

Further savings in process costs may be realized in roasting coffee in accord with the present invention by employing combustion products as the roasting fluid. Such products are substantially inert, which eliminates the need for an inert gas generator or other source of inert roasting gas. At the same time, heating of the roasting medium is economically accomplished.

Further advantages of the present invention over conventional atmospheric type roasters are that: (1) the processing can be more accurately controlled, which results in a product of higher and more uniform quality; and (2) it is more versatile and flexible and can therefore be used to roast a greater variety of coffees without modification.

From the foregoing, it will be apparent that further important objects of the present invention include the provision of novel methods for the atmospheric pressure roasting of coffee and the processing of other particulate solids which:

(1) Permit the solids being processed to be heated or roasted and cooled in the same reaction vessel.
(2) Employ an improved technique to arrest the roast or other heat treatment and thereby minimize residual-heat induced changes in the solids being processed.
(3) Permit the use of combustion products as a roasting or other heat treating medium.
(4) Produce higher yields than the methods heretofore employed to carry out such processes.
(5) Produce a product which is more uniform and has a higher quality than can be produced by the techniques in current use.
(6) Reduce the cost of roasting coffee and similar processing of other particulate solids.
(7) Provide greater flexibility and versatility and more accurate control over the roasting or other process.

Further objects, additional advantages, and other important features of the present invention will become apparent from the appended claims and as the ensuing detailed description and discussion proceeds in conjunction with the accompanying drawing, in which:

FIGURE 1 is a side view, partly diagrammatic and partly in section, of apparatus for roasting coffee and other particulate solids in accord with the principles of the present invention;

FIGURE 2 is a diagrammatic section through the reaction vessel of the apparatus of FIGURE 1 as it appears during the roasting portion of the processing cycle;

FIGURE 3 is a view similar to FIGURE 2 of the reaction vessel as the roasted beans are transferred from the roasting chamber to the cooling chamber;

FIGURE 4 is a view similar to FIGURE 2 of the reaction vessel as it appears during the cooling portion of the processing cycle;

FIGURE 5 is a view similar to FIGURE 2 of the reaction vessel as the cooled product is discharged from the cooling chamber; and FIGURE 6 is a partly sectioned diagrammatic side view of an alternate arrangement for heating the gaseous medium employed to fluidize and rotate the bed of and roast or otherwise heat the solids in the reaction vessel.

Referring now to the drawing, FIGURE 1 depicts a coffee roasting plant or system 10 constructed in accord with the principles of the present invention. System 10 includes, generally, a reaction vessel 12 into which unroasted or green beans are loaded from a hopper 14 through an inlet 16, a roasting fluid heating and circulating system 18, a cooling fluid treating and circulating system 20, and a conveyor 22 onto which the roasted and cooled beans are dumped.

The most important component of roasting system 10 and one of the most important features of the present invention is reaction vessel 12. The reaction vessel has a cylindrical, vertically oriented shell 24 closed at its upper and lower ends by a flat top wall 26 and an inverted frustoconical bottom wall 28, respectively. At approximately the midpoint of shell 24, its interior is divided into an upper roasting section 30 and a lower cooling section 32 by an inverted frustoconical partition 34. Suitable insulation 36 is applied to the lower side of partition 34 to minimize the transfer of heat from roasting section 30 to cooling section 32. A central opening 38 is provided in the lower end of partition 34 and in insulation 36 for transferring beans from roasting section 30 to cooling section 32.

A second aperture, 40, formed in reaction vessel shell 24 above partition 34, accommodates an inlet conduit 42 for a heated roasting fluid. The fluid flows from conduit 42 into the reaction vessel, through a flow control assembly 44, and then upwardly through the bed 46 of beans being roasted and through outlet 48 into exhaust conduit 50.

In addition to the components just described, the roasting section 30 of reaction vessel 12 also houses a dump mechanism 52. The dump mechanism 52 controls the transfer of the beans in bed 46 from roasting section 30 to cooling section 32 of the reaction vessel.

The fluid distributing and directing or flow control assembly 44 just mentioned is one of the most important components of reaction vessel 12. It directs the treating fluid entering the reaction vessel into the bed of solids 46 in such a manner as to fluidize the bed and rotate it by circulating the solids upwardly in the peripheral regions of the reaction vessel, inwardly toward the center of the reaction vessel in the upper part of bed 46, downwardly in the central regions of the reaction vessel, and outwardly in the lower part of bed 46. The pattern of circulation is shown by arrows 54 in FIGURE 1. Circulation of the coffee beans or other particulate solids being treated through a path of the type just described is of extreme importance as it provides intimate, uniform contact between the particles in bed 46 and the heated fluid flowing through the bed with the resulting advantages described previously.

Flow control assembly 44 includes an outer frustoconical flow plate 56 bolted or otherwise fixed to the interior of reaction vessel shell 24 and an inner flow plate 58 adapted to engage the lower edge of flow plate 56 to support the bed of beans 46. Outer flow plate 56 is constructed to direct 60–70% of the fluid entering the reaction vessel from inlet conduit 42 in a generally vertical direction upwardly through the bed of solids 46. The fluid flows through apertures 60 drilled or otherwise formed in the flow plate. The apertures are oriented at an angle of 45° to the upper surface 62 of the flow plate so that, when it is installed in reaction vessel 12, apertures 60 will be vertically oriented. Apertures 60 are arranged in circular rows with the radial distance between rows approximately equal. The number of apertures in each row is varied to maintain the distance between apertures 60 approximately equal, thereby providing a uniformly distributed air flow through the outer flow plate.

Inner flow plate 58 is also of frustoconical configuration and is typically fabricated from the same material as outer flow plate 56. Flow apertures 64 are formed in nozzle plate 58 at an angle of 30° to its upper surface 66 in equidistantly spaced apart rows with the holes in each row equidistantly spaced. The entrance ends of apertures 64 are countersunk to improve the flow of the gaseous medium through the apertures, and the exit ends are cut away at an angle of about 15° to prevent a build-up of bean residue in the apertures.

Like outer plate 56, inner flow plate 58 is oriented with its upper surface 66 at an angle of approximately 45° to the horizontal when installed in reaction vessel 12. The angle the nozzle plates make with the horizontal may be increased but should not be decreased substantially below 30°. This insures that the angle their upper surfaces make with the horizontal exceeds the angle of repose of the beans or other product being treated. If it does not, the product will not slide off the nozzle plates when dump mechanism 52 is operated to discharge the treated product from the reaction vessel.

From the foregoing it will be apparent that both the flow through apertures 60 in outer flow plate 56 and the flow through apertures 64 in inner flow plate 58 have large velocity components tangential to the fluidized rotating bed. This provides rapid and complete circulation of the solids in the rotating bed through paths of the configuration described above.

Flow plates of the type just described are disclosed in greater detail in my copending application No. 425,702 to which reference may be made if deemed necessary for a more complete understanding of the present invention. The latter application also discloses other flow plates which may be substituted for those described above, if desired.

Inner nozzle plate 58 is fixed, as by welding, to a vertically extending sleeve 68 incorporated in dump mechanism 52. The upper end of dump sleeve 68 is fixed, as by welding, to a shaft 70 which is connected to the piston rod 72 of a hydraulic motor 74. Piston rod 72 extends through the top wall 26 of reaction vessel shell 24 to the exterior of the reaction vessel. At its upper end piston rod 72 is fixed to a piston (not shown) in the hydraulic motor, which is supported from the reaction vessel shell top wall by a diagrammatically illustrated framework 76.

In addition to the components just described, dump mechanism 52 includes a conical closure member 78 fixed to the lower end of shaft 70. Closure member 78 seals the dump opening 38 between roasting section 30 and cooling section 32. A layer of insulation 80 on the lower side of the closure member reduces the flow of heat from the roasting section to the cooling section through the closure member.

As illustrated, closure member 78 is rigidly attached to shaft 70. However, it is to be understood that the closure member can, and in actual practice probably would, be fastened to the shaft in the manner described in my copending application 522,503 to more effectively seal dump opening 38.

Referring again to FIGURE 1, a second dump opening 82 is formed in the center of reaction vessel bottom wall 28 so that roasted and cooled beans may be discharged from cooling section 32 into conveyor 22. Another aperture 84, formed in the lower portion of shell 24 above bottom wall 28, accommodates an inlet conduit 86 for a cooling fluid. The fluid flows from conduit 86 upwardly through a second flow control assembly 88 and a bed 90 of beans being cooled and is exhausted from cooling section 32 through outlet 92 in reaction vessel shell 24 into an exhaust conduit 94.

In addition to the components just described, reaction vessel cooling section 32 houses a dump mechanism 96, which operates independently of the dump mechanism 52 in roasting section 30, for discharging cooled beans through dump opening 82 onto conveyor 22. Also disposed in the cooling section is a spray system 98 for distributing an inert liquid medium onto the beans being cooled to arrest the roast and thereby prevent residual-heat induced changes in the beans.

Flow control assembly 88 directs the fluid medium entering cooling section 32 into bed 90 in such a manner as to fluidize the bed and rotate the beans therein in a pattern identical to that described by the beans in bed 46.

The circulation of the coffee beans being cooled through a path of this type is extremely important as it provides intimate, uniform contact between the particles in bed 90 and the cooling medium. Even more important, this pattern of circulation insures intimate and uniform contact between the beans and the inert liquid distributed through spray system 98 to quench or arrest the roast.

Flow control assembly 88 includes an outer frustoconical flow plate 100 bolted or otherwise fixed to the interior of reaction vessel shell 24 and an inner frustoconical flow plate 102 adapted to engage the lower edge of flow plate 100 to support the bed of solids 90. Flow plates 100 and 102 may be identical to the flow plates 56 and 58 described above and function in the same manner as the latter.

Referring still to FIGURE 1, inner nozzle plate 102 is fixed to the lower end of a vertically extending sleeve 104 incorporated in dump mechanism 96. The upper end of dump sleeve 104 extends into a depending cylindrical guide 106 fixed in any suitable manner to closure member 78.

At its lower end dump sleeve 104 is connected through a bracket 108 to the piston rod 110 of a hydraulic motor 112. Intermediate its ends, piston rod 110 is fixed to a piston (not shown) in the hydraulic motor, which is supported from reaction vessel shell 24 by a diagrammatically illustrated framework 114.

Fixed to the lower end of piston rod 110 is a conical closure member 116 configured to seal the dump opening 82 in the bottom wall 28 of the reaction vessel. As in the case of closure member 78, closure member 116 may be and preferably is attached to piston rod 110 in the manner described in my copending. application No. 522,503.

The remaining important feature of reaction vessel 12, mentioned briefly above, is spray system 98. As shown in FIGURE 1, spray system 98 includes two circular headers 118 and 120 disposed in reaction vessel cooling section 32 adjacent partition 34.

Spaced equidistantly along header 118 are spray nozzles 122. Header 118 is connected to a source of inert liquid medium, generally water, by inlet conduit 124. The water or other liquid supplied through conduit 124 flows through header 118 and out nozzles 122 onto the beans in bed 90 as a fine mist. Since the bed of beans in the reaction vessel is continuously circulated by the gaseous medium supplied through conduit 86 as the beans are sprayed, there is a uniform application of the liquid medium to the beans and intimate contact of the liquid with the beans.

Nozzles 122 discharge a relatively large volume of liquid onto the beans to rapidly reduce their temperature. As the temperature of the beans decreases, it may be desirable to reduce the rate at which the inert liquid medium is added to the beans to insure that they have the proper moisture content and other characteristics when cooled. This is accomplished by terminating the flow through nozzles 122 at a predetermined point in the cooling cycle and distributing the remainder of the liquid onto the beans through header 120, which is connected to the source of inert liquid through inlet conduit 126.

Header 120 is provided with nozzles 128 which may be identical to nozzles 122. Nozzles 128 are preferably equidistantly spaced around the periphery of header 120 and are oriented to direct the liquid flowing through the header onto the bed 90 of beans being cooled.

As mentioned above, coffee roasting system 10 includes, in addition to the reaction vessel 12 just described, a roasting fluid heating and circulating system 18 and a cooling fluid treating and circulating system 20. Referring again to FIGURE 1, system 18 includes a heating unit 130 for the roasting fluid which is connected through a duct 132 to the inlet of a supply blower 134. The outlet of blower 134 is connected through supply conduit 42 to the inlet 40 to the roasting section of the reaction vessel.

Also, included in system 18 are the return duct 50, mentioned previously, which is connected from roasting fluid outlet 48 to a chaff separator 136. The chaff separator may be of the type disclosed in my Patent No. 3,189,460, issued June 15, 1965, for Roasting and Heating Methods or of any other desired construction. Chaff separated from the recirculated roating fluid in chaff separator 136 may be periodically dumped through a conduit 138 into a chaff collector 140 by opening a valve 142 in the conduit. The chaff collected in collector 140 can then be removed in any desired manner.

The cleaned air is returned from chaff separator 136 to heating unit 130 through a duct 144 connected between these two components. A vent duct 146 provided with a damper 148 is connected to duct 144 to maintain the volume of roasting fluid in the closed circulation system constant or to vary it as circumstances dictate.

The illustrated heating unit 130, which is of the indirect type, includes a casing 150 which houses a tubular heat exchanger 152 and a burner unit 154. Heat exchanger 152 is connected between ducts 144 and 132 so that, as recirculated roasting fluid flows through heat exchanger 152, it is heated to the desired temperature by combustion products, which are generated in burner unit 154 and flow upwardly through heater casing 150 across heat exchanger 152, and out flue 156. As heating units of the type just described are well known and as its details form no part of the present invention, further description of this unit is not considered necessary.

The treating and circulating system 20 for the cooling fluid includes an air washer 158 connected by a duct 160 to the inlet of a blower 162 by which the cooling fluid is supplied to the reaction vessel. Air washer 158 is of conventional construction. For this reason and because its details are not part of the present invention, it is not considered necessary to described it in detail herein.

Air washer 158 decreases the temperature of the fluid employed to effect circulation of and cool the bed of beans 90 and increases the moisture content of the fluid, adding to its capacity to remove heat from the beans being cooled. The function and operation of the air washer are described in greater detail in my copending application No. 522,503, to which reference may be had if deemed necessary.

To summarize the operation of coffee roasting system 10, the roasting fluid, which may be air, an inert gas or mixture of inert gases, or such other fluid or mixture of fluids as may be desired, is heated in heating unit 130. Supply blower 134 circulates the heated fluid through supply conduit 42 into the roasting section 30 of reaction vessel 12 through the inlet 40 in its lower end. The fluid is then directed into the bed 46 of beans to be roasted by flow assembly 44 in a manner which produces the novel circulation of the beans described previously. This provides a rapid turnover of the beans being roasted, providing a uniform and extremely rapid transfer of heat from the roasting fluid to the beans.

After passing through the bed of beans, the roasting fluid flows from reaction vessel 12 through outlet 48 and through return conduit 50 into chaff separator 136, where the chaff picked up by the fluid in reaction vessel 12 is separated. From the chaff separator, the cleaned roasting fluid flows through return conduit 144 back to heating unit 130 where it is reheated and recirculated to the reaction vessel. If desired, part or all of the recirculated roasting fluid can be discharged from the circulation system by opening the valve or damper 148 in vent duct 146.

When the beans are roasted, hydraulic fluid is admitted to the upper end of hydraulic motor 74. This drives piston rod 72 and the shaft 70 of dump mechanism 52 downwardly, moving inner conical flow plate 58 (which is attached to shaft 70 through dump sleeve 68) and closure member 78 from the positions shown in FIGURE 2 to those shown in FIGURE 3. This permits the roasted beans to flow by gravity through an annular gap 164 between the outer and inner flow plates onto intermediate partition 34. The beans then flow down partition 34 and through dump opening 38 into the cooling section 32 of reaction vessel 12.

When all of the beans have been deposited in cooling section 32, hydraulic fluid is admitted to the lower end of hydraulic motor 74. This moves piston rod 72, together with shaft 70, dump sleeve 68, inner flow plate 58, and closure member 78, from the positions shown in FIGURE 3 to the positions shown in FIGURE 4. In these positions inner flow member 58 engages outer flow member 56, and closure member 78 seats against the lower edge of partition 34 to seal dump opening 38.

When the components of dump mechanism 52 have returned to the positions just described, blower 162 is started. This effects a flow of cooling fluid (which will typically be air but may be such other fluid as is desired) into air washer 158, where its relative humidity is increased. The humid fluid then flows through duct 160, the blower, duct 86, and inlet 84 into the cooling section 32 of reaction vessel 12. The fluid thus supplied to the reaction vessel is directed into the beans by flow control assembly 88 to circulate them in the manner and for the purposes described previously. After passing through the bed 90 of beans, the cooling fluid is exhausted from the reaction vessel through outlet 92 and exhaust conduit 94.

Shortly after the beans in bed 90 have begun to circulate, spray system 98 is actuated in the manner described in my copending application 522,503 to effect a flow of quenching liquid through header 118 and nozzles 122, which break the liquid into a fine mist and distribute it uniformly over the circulating beans. As mentioned previously, this rapidly reduces the temperature of the hot roasted beans, arresting the roast at a definite point. In addition, as discussed in detail in the copending application just mentioned, the spray can be employed to control the moisture content of the roasted and cooled beans.

All of the quenching liquid can be delivered through header 118 or, as mentioned previously, the flow through header 118 can be terminated at a predetermined point in the cooling cycle and the remaining liquid supplied through header 120 and nozzles 128 at a slower rate.

As soon as the roast has been arrested and the desired quantity of liquid supplied to the beans, the spray or sprays may be stopped. At this time, the temperature of the beans will typically be several degrees above the temperature to which it is desired to cool them. The cooling can be completed by continuing the supply of cooling fluid through conduit 86.

When the final temperature is reached, blower 162 is stopped; and hydraulic fluid is admitted to the upper end of the hydraulic motor 112 incorporated in dump mechanism 96. This moves piston rod 110, together with inner flow plate 102 and closure member 116, from the positions shown in FIGURE 4 to the positions shown in FIGURE 5. As shown in the latter figure, this permits the roasted and cooled beans to flow through an annular opening 166 between flow plates 100 and 102 onto the bottom wall 28 of reaction vessel 12 and through dump opening 82.

When the beans have been dumped from cooling section 32, hydraulic fluid is admitted to the bottom end of hydraulic motor 112, returning closure member 116 and inner flow member 102 to the positions shown in FIGURE 2. This readies cooling section 32 for a subsequent load of beans.

As mentioned above, the two dump mechanisms 52 for the roasting section and 96 for the cooling section of reaction vessel 12 operate independently. This is an important feature of the present invention because it permits one batch of beans to be roasted while the subsequent batch is being cooled as shown in FIGURE 1.

FIGURE 6 illustrates an alternate system 168 for heating roasting fluid for coffee roasting system 10. Several components of this system are identical to those of system 18. These have been identified by the same reference characters as were employed in FIGURE 1.

Heating system 168 may advantageously be employed in applications where combustion products may be used as the roasting medium. This includes many applications of the present invention since, if the combustion is carefully controlled, combustion products are virtually inert in that they consist essentially of nitrogen, carbon dioxide, and water vapor with only a small amount of air. Where possible, it is preferable to use combustion products as a roasting medium because of the operating economies they provide.

In heating system 168, the indirect air heating unit 130 of system 18 is replaced with a direct heating unit 170 which includes a burner 172, a premixer 174, and preferably, but not necessarily, a combustion air preheater 176. The latter component consists of a casing 178 having an air inlet 180 at one end and communicating at the other with premixer 174. Air preheater 176 also includes a tubular type heat exchanger 182 with its inlet end connected to the outlet of blower 184. The inlet of blower 184 is connected to roasting gas return conduit 144 by a branch conduit 186. Therefore, when blower 184 is operated, relatively hot fluid exhausted from reaction vessel 12 is pumped by blower 184 through conduit 186 and heat exchanger 182.

Combustion air enters preheater 176 through inlet 180 and flows over heat exchanger 182, which heats the air before it passes into premixer 174 where it is mixed with fuel supplied through conduit 188. The combustible mixture is burned in combustion chamber 172.

The hot combustion products generated in combustion chamber 172 flow into duct 132 where they are mixed with the roasting fluid recirculated from reaction vessel 12. The reheated fluid is then pumped through duct 42 into the reoasting section 30 of reaction vessel 12.

In heating system 168, fluid is continuously added to the system by heating unit 170. Part of this additional volume is compensated for by the fluid diverted through heater exchanger 182 and exhausted from the system if the latter is employed. If this degree of compensation is not sufficient, or if the air preheater is not utilized, damper 148 may be opened to vent the excess fluid from the system through duct 146.

Many modifications may be made in the illustrated embodiments of the present invention without departing from its principles. For example, an air preheater as illustrated in FIGURE 6 may be added to the air heating unit 130 illustrated in FIGURE 1. Moreover, the controls and other features of the various forms of apparatus illustrated in my copending applications 425,702 and 522,503 may be incorporated in systems constructed in accord with this invention, if desired. To the extent that these and other modifications of a similar nature are not expressly excluded from the appended claims, they are fully intended to be covered therein.

Also, the principles of the present invention may be adapted to processes other than coffee roasting. Among other processes for which the present invention is suited are the roasting of nuts and the drying of cereals and the like as well as many others. Such applications of my invention are also intended to be covered in the appended claims to the extent that they are not expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, all changes which come within the meaning and range of equivalency of the claims are therefore intended to be embraced therein.

What is claimed and desired to be secured by Letters Patent is:

1. A method of roasting coffee beans and similar particulate solids in a vessel having upper and lower processing compartments therein, comprising the steps of:
 (a) introducing the solids to be roasted into the upper compartment until a bed of said solids is formed therein;
 (b) roasting the solids in said upper compartment by effecting a flow of a heated fluid medium into said bed, a first part of the fluid medium being directed upwardly through the outer regions of the bed, said upwardly directed part of the fluid medium having a sufficiently large vertical component to transport the particles upwardly in the outer regions of the bed, and the remainder of the fluid medium being directed into the lower inner part of the bed and toward the periphery thereof, said peripherally directed part of the fluid medium having a sufficiently high lateral flow component to cause outward movement of the particles in the lower part of the bed;

(c) transferring said roasted solids by gravity from said upper compartment to said lower compartment;

(d) cooling the roasted solids in said lower compartment by effecting a flow of a fluid medium into the bed of solids in said lower compartment, a first part of the fluid medium being directed upwardly through the outer regions of the bed, said upwardly directed part of the fluid medium having a sufficiently large vertical component to transport the particles upwardly in the outer regions of the bed, and the remainder of the fluid medium being directed into the lower inner part of the bed and toward the periphery thereof, said peripherally directed part of the fluid medium having a sufficiently high lateral flow component to cause outward movement of the particles in the lower part of the bed; and (e) discharging the roasted and cooled solids from said lower compartment.

2. The method as defined in claim 1, wherein fluid medium discharged from the upper compartment is reheated and recirculated to said upper compartment.

3. The method as defined in claim 1, wherein said heated fluid medium consists of substantially inert combustion products.

4. The method as defined in claim 1, together with the step of increasing the relative humidity of said cool fluid before introducing it into said lower compartment to increase its heat absorbing capacity.

5. A method of roasting coffee beans and similar particulate solids in a single vessel having upper and lower processing compartments therein, comprising the steps of:

(a) introducing the solids to be roasted into the upper compartment until a bed of said solids is formed therein;

(b) simultaneously fluidizing and rotating said bed of solids by effecting a flow of heated fluid into said bed, said flow being continued until said solids are roasted;

(c) transferring said roasted solids by gravity from said upper compartment into said lower compartment;

(d) fluidizing and rotating the bed in said lower compartment by effecting a flow of relatively cool fluid into contact with said solids;

(e) rapidly reducing the temperature of said solids by spraying a liquid onto the fluidized and rotating bed of solids; and (f) further cooling said solids by continuing said flow of cool fluid subsequent to the termination of the spray.

References Cited

UNITED STATES PATENTS

| | | | |
|---|---|---|---|
| 2,105,778 | 1/1938 | Behr et al. | 34—57 |
| 2,292,897 | 8/1942 | Nielsen. | |
| 3,110,626 | 11/1963 | Larson et al. | |
| 3,112,220 | 11/1963 | Heiser et al. | |
| 3,149,976 | 9/1964 | Smith | 99—68 |
| 3,189,460 | 6/1965 | Smith | 99—68 |
| 3,216,125 | 11/1965 | Dennert | 34—57 |

FOREIGN PATENTS

| | | |
|---|---|---|
| 244,239 | 4/1960 | Australia. |
| 544,638 | 8/1957 | Canada. |

OTHER REFERENCES

Perry et al., "Chemical Engineers' Handbook," 4th Ed. 1963, McGraw-Hill Book Co., Inc., New York. Chap. 11 p. 18 (11–18).

Sivetz et al., "Coffee Processing Technology," vol. I, 1963, The Avi Publishing Co., Inc., Westport, Conn., pp. 207–208.

MAURICE W. GREENSTEIN, *Primary Examiner.*

JOSEPH M. GOLIAN, *Examiner.*